US009878527B1

(12) United States Patent
Henard

(10) Patent No.: US 9,878,527 B1
(45) Date of Patent: Jan. 30, 2018

(54) METHOD FOR APPLYING ADHESIVE MEDIA TO PAPER

(71) Applicant: Zachary Galen Henard, Clarksville, TN (US)

(72) Inventor: Zachary Galen Henard, Clarksville, TN (US)

( * ) Notice: Subject to any disclaimer, the term of this patent is extended or adjusted under 35 U.S.C. 154(b) by 105 days.

(21) Appl. No.: 14/919,775

(22) Filed: Oct. 22, 2015

Related U.S. Application Data

(63) Continuation-in-part of application No. 13/729,690, filed on Dec. 28, 2012, now abandoned.

(51) Int. Cl.
*B05D 5/10* (2006.01)
*B32B 37/12* (2006.01)
*B32B 37/00* (2006.01)

(52) U.S. Cl.
CPC .......... *B32B 37/12* (2013.01); *B32B 37/0046* (2013.01); *B32B 2405/00* (2013.01)

(58) Field of Classification Search
CPC .. B32B 37/12; B32B 37/0046; B32B 2405/00
See application file for complete search history.

(56) References Cited

U.S. PATENT DOCUMENTS

| | | | | |
|---|---|---|---|---|
| 4,066,808 A | * | 1/1978 | Carter | B65C 9/14 118/221 |
| 5,735,998 A | * | 4/1998 | Bradshaw | B65C 9/1892 100/176 |
| 2002/0074090 A1 | * | 6/2002 | Osumi | B32B 37/0053 156/577 |
| 2003/0012911 A1 | * | 1/2003 | Campbell | B31D 1/021 428/40.1 |

* cited by examiner

*Primary Examiner* — Xiao S Zhao
(74) *Attorney, Agent, or Firm* — Stephen J. Stark; Miller & Martin PLLC

(57) ABSTRACT

A method of using a device to apply adhesive to a medium is disclosed. Preferably, a device allows the hand loading of a medium, such as paper, etc., to then have a strip of adhesive applied thereto so the medium can be applied to a surface (like a sticky note).

11 Claims, 7 Drawing Sheets

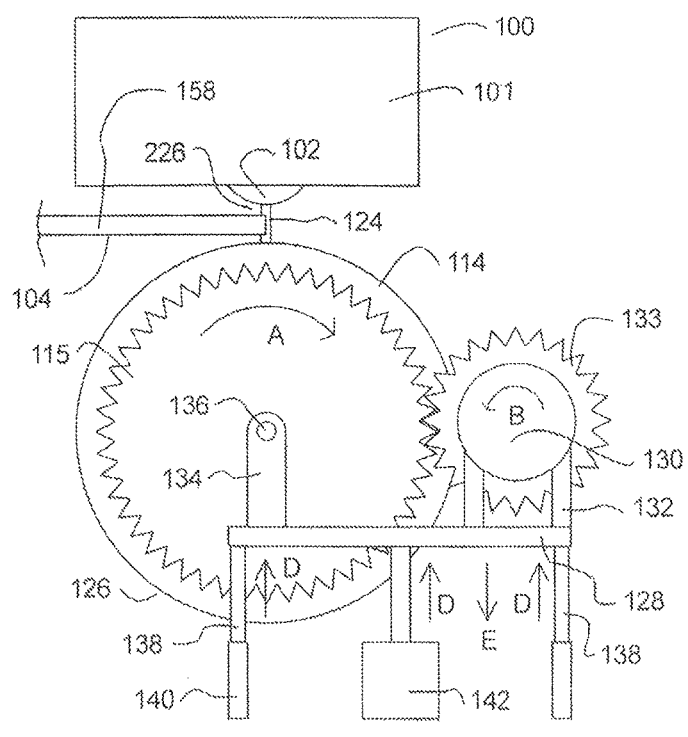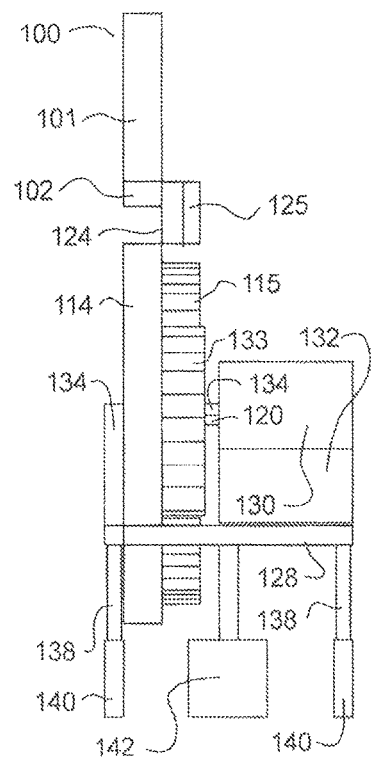
Fig. 1
Fig. 2
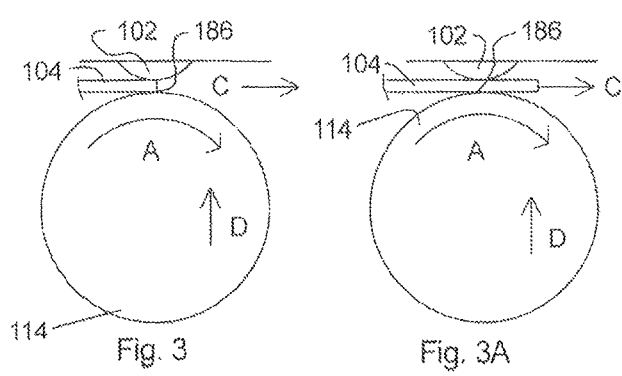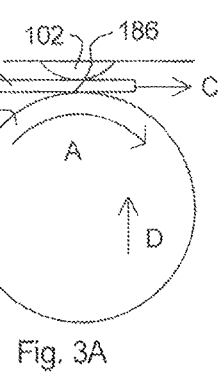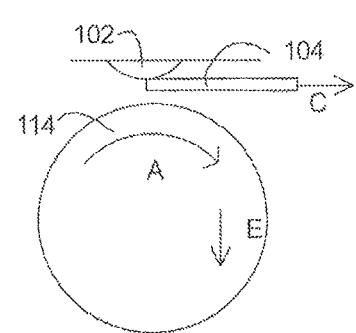
Fig. 3
Fig. 3A
Fig. 3B

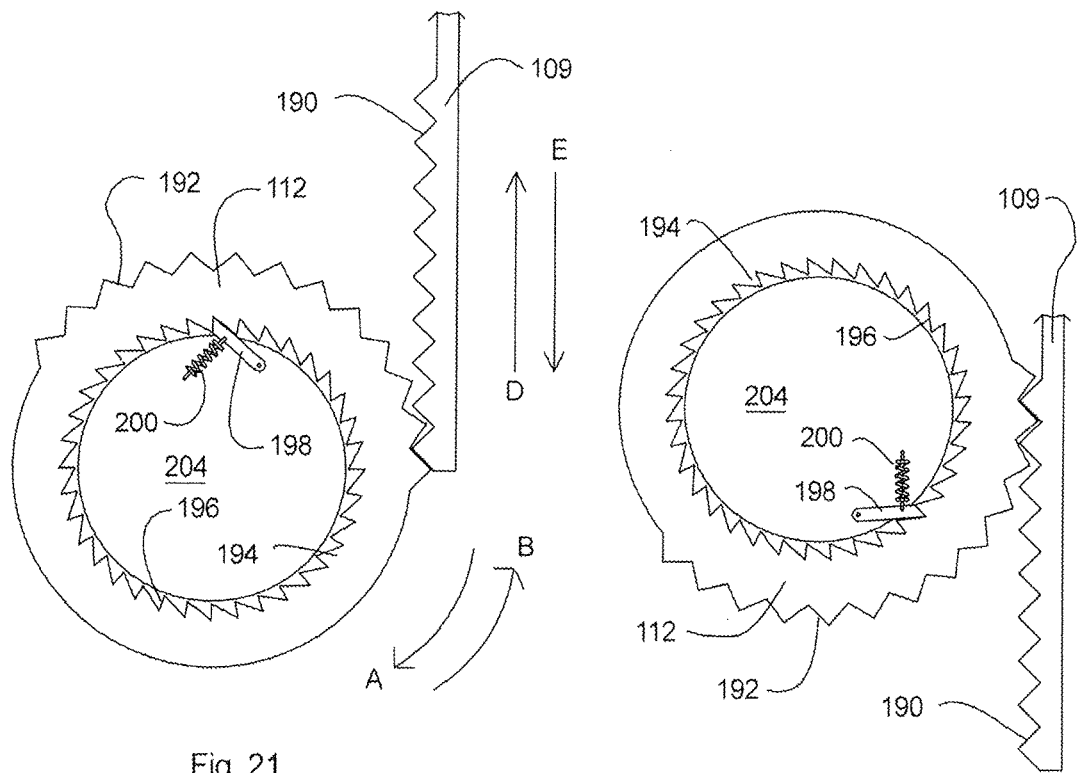
Fig. 21
Fig. 22
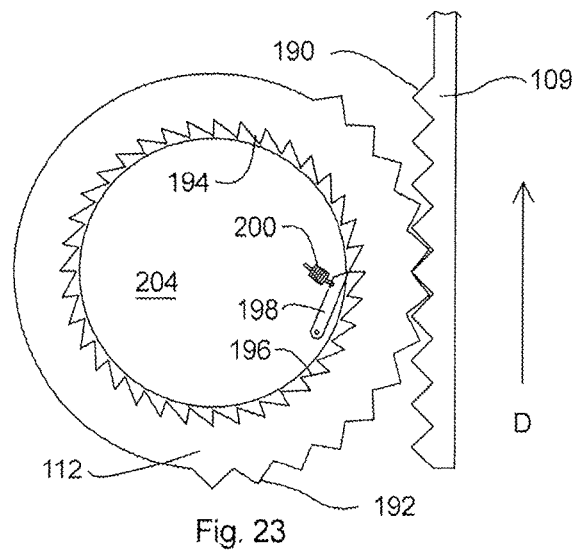
Fig. 23

METHOD FOR APPLYING ADHESIVE MEDIA TO PAPER

CLAIM OF PRIORITY

This application is a continuation-in-part of U.S. application Ser. No. 13/729,690 filed Dec. 28, 2012 incorporated herein by reference in its entirety.

BACKGROUND OF THE INVENTION

This invention relates generally to the field of adhesive note media and more specifically to a machine for adhesive media application to a paper edge.

The practice of communication by the placement of a brief written document on paper, commonly referred to as a "note," in a spot where it is likely to be seen by those to whom information written thereon is deemed beneficial is a popular art.

Toward this end, a fairly recent and extremely popular development in the art is the application of an adhesive to a peripheral portion of the note medium face so that said adhesive may be employed to fix the note in optimal location.

This popularity has thus resulted in contrivance of various devices that may be exploited by a user to individually, easily, and quickly manufacture a note medium, with adhesive, at the time said note medium is required.

In example, U.S. Pat. No. 5,080,254 by Feer discloses a dispenser for note paper sheets having adhesive. The sheets are placed in a container with a slot. The sheets are adhered at opposite edges so that when one sheet is pulled through the slot, the sheet adhered to the opposite end is pulled through the slot. When the first sheet is disengaged from the sheet just pulled through the slot, said sheet is ready to be withdrawn from the container and the disengaged sheet may be annotated and stuck to a convenient surface.

In contract to the instant art, Feer requires a plurality of note paper sheets each having adhesive previously applied. Feer does not apply adhesive to sheets, nor does Feer apply adhesive to individual sheets inserted into a container one sheet at a time.

U.S. Pat. No. 5,605,572 by Berger teaches an adherent applicator whereby adhesive may be applied to a sheet of paper as the paper is drawn between an adhesive applicator and an anvil. Berger requires two hands for operation, one hand to apply pressure to the glue applicator to force it against the anvil and one hand to draw the paper between the anvil and the applicator.

In contrast to Berger, the instant art recites embodiments wherein the sheet may be drawn through automatically or wherein adhesive is applied to a stationary sheet inserted into a device. The instant art does not require two hands for operation, but instead makes provision for automatic or mechanically powered operation.

U.S. Pat. No. 3,545,403 by Beers teaches a device to apply a strip of material, in example ink, to a sheet of medium. The medium is inserted into the device and drawn past a stationary applicator. Hand pressure is applied to the applicator to cause transfer of material to the medium and the medium is drawn past the applicator by hand.

In contrast to Beers, the instant art teaches embodiments wherein operation is fully automatic and virtually hands free.

U.S. Pat. No. 5,632,853, by Montandon, Jr. et al. teaches a desk top book binding device whereby adhesive is applied to the edges of a stack of sheets of paper by means of a belt which transfers said adhesive from a reservoir to the paper.

In contrast to Montandon, Jr. et al., the instant device does not apply adhesive to the edges of sheets but to a portion of each sheet top or bottom face. Neither is the instant device limited to adhesive transfer by means of a belt.

U.S. Pat. No. 5,470,386 by Harris teaches a glue applicator which applies liquid adhesive to a medium by means of a roller. Harris makes no provision for the application of adhesive to a limited portion of a sheet but in operation, must apply adhesive to an entire sheet surface.

In contrast, the instant device is not limited to liquid adhesive nor to applicators having rollers and is preferably configured to apply adhesive only to select portions of the note medium.

U.S. Pat. No. 7,144,469 B2 by McCarthy, et al. teaches printable sheet constructions adapted to be fed into printers, said constructions having sections which may be removed therefrom and applied to various surfaces or objects. McCarthy et al. does not teach means to apply adhesive to inserted sheets. Instead, the sheets are manufactured with adhesive already applied under a peelable surface.

In contrast to McCarthy et al., the instant art does not require previously constructed sheets having separable sections, but teaches individual sheets to which adhesive is applied.

U.S. Pat. No. 3,138,312 by Newman teaches a note paper sheet dispensing device which delivers note sheets from a roll. A lever is activated which powers a device that cuts individual sheets from a roll.

In contrast, Newman does not apply adhesive to individual sheets. In additional contrast, the instant art does not require a means to cut sheets from a roll.

The instant art eliminates the above disadvantages, requirements, and limitations and is therefore a needed and desirable advancement in the arts.

BRIEF SUMMARY OF THE INVENTION

The primary object of the invention is to provide an automated device and method for uniformly applying adhesive to a note medium on an as needed basis.

Another object of the invention is to compromise automatic virtually hands free (other than loading and unloading) operation of an automated method of uniformly applying adhesive to a note medium on an as needed basis.

Another object of the invention is to recycle medium that would otherwise be discarded into useful items.

A further object of the invention is to compromise a compact configuration of an automated device for uniformly applying adhesive to a note medium on an as needed basis suitable for disposition and use on desk tops.

Yet another object of the invention is to compromise a novelty or conversation piece for desk tops.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for note medium adhesive application comprising: an adhesive applicator and a drive wheel.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a front view of an embodiment of the invention.
FIG. 2 is a side view of an embodiment of the invention.
FIG. 3 is a front view of elements of the invention.
FIG. 3A is a front view of elements of the invention.
FIG. 3B is a front view of elements of the invention.
FIG. 21 is a front view of an element of an embodiment of the invention.
FIG. 22 is a front view of an element of an embodiment of the invention.
FIG. 23 is a front view of an element of an embodiment of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

For the purposes of these specification and claims the word "solenoid" shall include any device or configuration of elements producing motion having a linear component by means of electromagnetic force and either comprising or not comprising a bias element.

FIGS. 1 and 2 show a device 100 to apply adhesive to a portion of a note medium 104, in example paper 158, which may comprise scrap that would otherwise be discarded, thusly converting the scrap into a note medium 104 which may be written upon and adhered to a convenient surface where it may be read by appropriate people.

Figure 15:
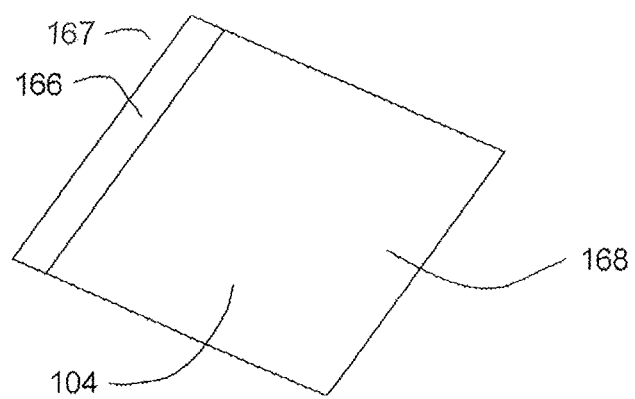
FIG. 15 is an elevational view of a product of the invention.

In particular, FIGS. 1 and 2 show an adhesive applicator 101 of any suitable type or one specially contrived for use and a sensor 124 which may also have a logic unit 125. Drive assembly 126 is shown supported by a drive assembly platform 128. Said platform 128 comprises stanchions 134 that rotatably support an axle 136. Said axle 136 communicates with a medium drive wheel sprocket 115 having a medium drive wheel 114 configured such that the medium drive wheel 114 rotates when the sprocket 115 rotates. It will be readily appreciated that the type of adhesive employed may vary, in example, said adhesive may be liquid, solid, semi-solid, microencapsulated or any other type having a dispenser 102. Preferred applicators 101 may have a wheel like structure having as a dispenser 102 that directs a tape-like adhesive such as a replaceable roll of double sided tape supported for operation by the applicator 101 or other adhesive based tape so that during operation the tape is applied to the note medium 104 as discussed herein. The dispenser 102 preferably applies strip 166 to material 168, as shown in FIG. 15 by rolling the strip 166 against the material 168 during the method of attaching the strip 166 to the material 168. The note medium 104 can now be attached like a 'sticky note' for many embodiments with the adhesive strip 166 providing enough support the weight of the note medium 104, but not so much stickiness to provide a permanent or semi-permanent bond. Other embodiments may have other characteristics.

Supported on the drive assembly platform 128 by motor mounts 132 is a motor 130, in example an electric motor, having a wheel shaft 120 which rotates a motor gear 133. The motor gear 133 communicates with the medium drive wheel sprocket 115 so as to transfer rotary motion thereto as indicated by curved arrows A and B said motion providing operative force for the device 100.

Additionally shown are drive assembly platform supports 138 which support the platform 128 and are slidable in drive assembly platform support sleeves 140. Also communicating with the platform 128 is a solenoid 142.

One skilled in the art will readily appreciate that that when the sensor 124 detects that the suitable medium 104 is interposed between the drive wheel 114 and the adhesive applicator 102, it, possibly in conjunction with the sensor logic unit 125, may activate the solenoid 142, thusly providing operative force, which will move the drive assembly 126 toward the adhesive application 102 in direction indicated by arrow D. Further, the sensor 124, possibly in conjunction with logic unit 125, may also activate the motor 130 which will impart rotation to the medium drive wheel 114 in direction of curved arrow A as previously described, possibly while unrolling tape based strip 166 from dispenser 102.

Therefore, as seen in FIG. 3, when the solenoid 142 moves the drive assembly platform 128, as indicated by arrow D, the note medium 104 will be pressed against the adhesive applicator 102 between said applicator 102 and the medium drive wheel 114 creating sufficient friction that the note medium 104 will be moved in direction indicated by arrow C such as when hand fed as seen in FIGS. 3 and 3A and creating sufficient contact between the note medium 104 and the adhesive applicator 102 that adhesive is transferred to a portion of said note medium 104. Thusly, the medium 104 is oriented in operative position.

Additionally, as seen in FIG. 1, if the medium 104 is interposed between the drive wheel 114 and the adhesive applicator 102 so that there is a gap 226 between said medium 104 and said adhesive applicator 102 then the medium 104 will be moved in direction D as the drive assembly platform 128 is moved in direction D to press said medium between the adhesive applicator 102 and the drive wheel 114.

Then, as seen in FIG. 3B, when the note medium 104 has been propelled between the adhesive applicator 102 and the medium drive wheel 114 to the extent of its length, the sensor 124, in conjunction with the logic unit 125 will disengage the motor 130 and will engage the solenoid 142 to lower the drive assembly 126, in direction E, away from the adhesive applicator 102 thusly disengaging the adhesive applicator 102 and the medium drive wheel 114 from the note medium 104. It will be readily seen that direction C is essentially normal directions D and E. Without the pressure, the strip 166 may be broken or cut from dispenser 102, and one may hand remove the note medium 104 which may appear now as shown in FIG. 15 or otherwise.

Also, the activation of the solenoid 142 raising the drive assembly platform 128 while the drive assembly supports 138 slide in the drive assembly support sleeves 140 may be coordinated to ensure deposition of adhesive only on the note medium 104. In example, the solenoid 142 may be activated to raise the drive assembly platform 128 before the medium drive wheel 114 is activated.

The use of sensors and/or logic units to regulate operation of machinery is well known and may easily be contrived for operation of the instant art by one skilled in the art. Therefore, the sensor and/or logic unit control of the instant art will not be described in detail. Sensors which could detect presence of note medium 104 only, the absence of note medium 104 only, or one sensor which could detect either absence or presence of medium 104 are known and could be exploited in combination or individually in the instant art.

While the mechanism 100 to apply adhesive to a note medium 114 may comprise automated motor power, in example from an electric motor, one skilled in the art will readily appreciate that the mechanism 100 may be configured for manual operation.

Figure 4:
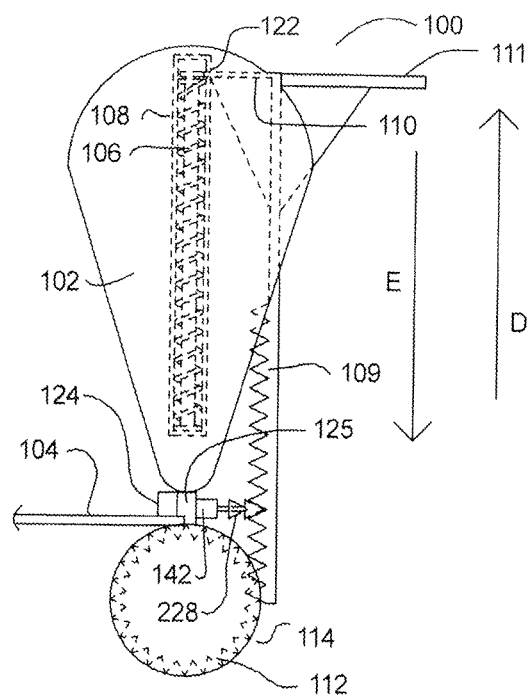
FIG. 4 is a front view of an embodiment of the invention.
Figure 5:
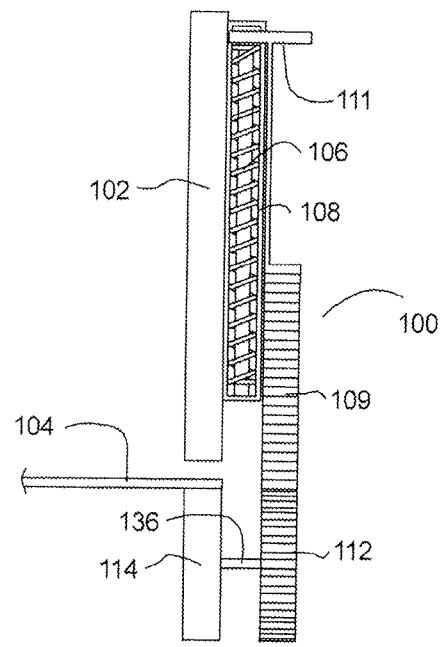
FIG. 5 is a side view of an embodiment of the invention.

FIGS. 4 and 5 show an adhesive applicator 102 in communication with bias element, 106 in a bias element housing 108 having a slot 122. Also seen are a rack 109 and pinion 112 with a rack extension 110 affecting communication between the rack 109 and the bias element 106 through the slot 122. A push tab 111 extends from the rack extension 110 proximal the point of communication between said rack extension 110 and bias element 106. The pinion 112 communicates essentially coaxially with a medium drive wheel 114 by means of axle 136.

Now it will be understood that a note medium 104 may be positioned between the adhesive applicator 102 and the medium drive wheel 114. The push tab 111 may then be moved in direction indicated by arrow E. The adhesive applicator 102 will move in direction indicated by arrow E until said applicator 102 contacts the note medium 104 whereupon further said movement of the adhesive applicator 102 is arrested and continued movement of the push tab 111 overcomes the bias element 106. Said movement of the push tab 111 a particular distance may be considered a "stroke," and one skilled in the art will readily appreciate that said stroke provides operative force to the device 100.

Concurrent with movement of the push tab 111 is movement of the rack 109 which imparts rotation in direction indicated curved arrow A to the pinion 112 and thereby simultaneously to the medium drive wheel 114.

Figure 6:
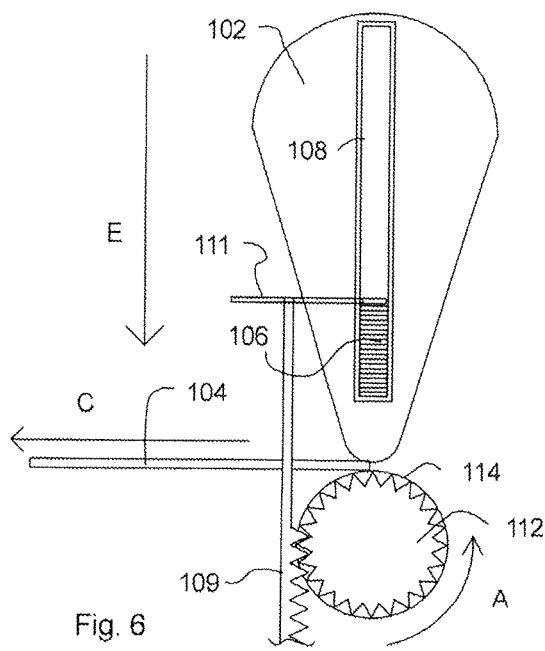
FIG. 6 is a rear view of an embodiment of the invention.

Looking at FIG. 6, one sees that the applicator 102, by movement of the push tab 111 in direction indicated by arrow E, is pressed against the note medium 104 grasping the note medium 104 between the adhesive applicator 102 and the drive wheel 114 causing sufficient friction between said note medium 104 and said medium drive wheel 114 for the note medium 104 to be drawn in the direction indicated by arrow C when medium drive wheel 114 rotates. Sufficient contact is also created between the note medium 104 and the adhesive applicator 102 to cause deposition of adhesive such as a tape strip 166 on said note medium 104 as it is drawn past, such as along an edge 167 of the material 168. After the note medium 104 has passed between the drive wheel 114 and the adhesive applicator 102 to the extent of its length or to the extent of the rotation caused by the push tab 111 stroke, the push tab 111 may be released whereupon the bias element 106 will return the rack 109 and the adhesive applicator 102 to their original positions shown in FIG. 4. Thusly, adhesive is applied to a portion of a note medium 104 such as no more than about 1" of an adhesive strip 166 preferably along an edge of the medium 168 and preferably terminating before or at another edge of the medium 104 and for many embodiments no more than held a wider of the medium 104.

Now it will be understood that if the extent of the rotation imparted by one push tab 111 stroke is insufficient to cause adhesive application to the extent of the length or width of the note medium 104, the device 100 may comprise means to apply adhesive to remaining portions of said medium 104 by subsequent strokes of the push tab 111 as well as a way to stop applying after the medium 104 at a selected position of the medium, such as an edge.

In example, FIG. 21 shows a pinion 112 having an essentially internal annual ratchet 194 having teeth 196. Within said pinion 112, disposed essentially coaxially therewith, is a pinion ratchet disc 204 which may rotate independently of the pinion 212. Also, a pawl 198 movably or pivotably engages the pinion ratchet disc 204 and at the same time engages a pinion ratchet tooth 196. Teeth of pinion 112 could be used to cut duplicate strip 166 when medium 168 has passed or other methods of cutting a tape could be employed with other embodiments.

Now, one skilled in the art will readily appreciate that the rake of the pinion ratchet teeth 196 is contrived such that the pawl 198 will engage a pinion ratchet tooth 196 when the pinion 112 is rotated in direction A by action of the rack 109 as previously described and shown in FIGS. 21 and 22 wherein rack 109 is moved in direction E. Thus, the pawl 198 will transfer said rotation to the pinion ratchet disc 204, thus the pinion ratchet disc 204 and the pinion 112 will rotate simultaneously. Contrarywise, as in FIG. 23, when the pinion 112 is rotated in direction B by action of the rack 109. In example when rack 109 is moved by bias element 106 in direction D as previously described, the rake of the pinion ratchet teeth 196 will cause the pawl 198 to swivel and thus disengage the tooth 196 and prevent re-engagement of any of the pinion ratchet teeth 196 when said pawl 198 as long as rotation of pinion 112 remains in direction B. Therefore, rotation of the pinion 112 without transfer of said rotation to the pinion ratchet disc 204 is accomplished.

FIGS. 21, 22, and 23 also show that the pinion 112 need not comprise teeth 190 sufficient to circumvent said pinion 112 but only enough to accommodate the motion of the rack 109 in direction D. Additionally, the pawl 198 and pinion ratchet disc 204 may comprise a bias element 200 biasing said pawl 198 in engagement with the pinion ratchet tooth 196 such that when the pinion 112 is rotated in direction B, the rake of the ratchet tooth 196 will cause the pawl 198 to disengage the ratchet tooth 196 by overcoming the bias element 200.

Figure 7:
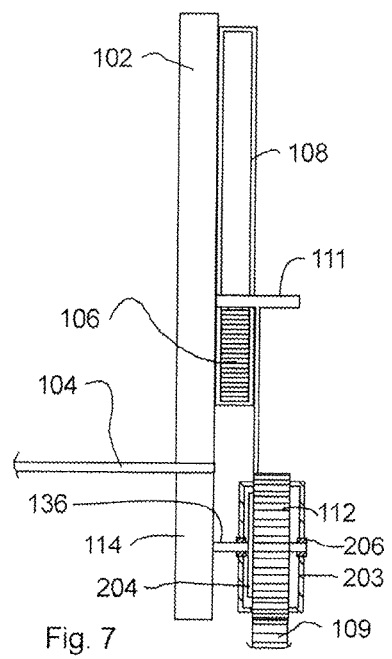
FIG. 7 is a side view of an embodiment of the invention.

FIG. 7 shows that axle 146 may affect rotation transferring communication with the pinion ratchet disc 204 and the drive wheel 114. Also seen is that the pinion 112, by means of pinion extension 203, may communicate with the axle 136, in example by bushing or journal 206, so that the pinion 112 may rotate independently of said axle 136.

Therefore, it will be understood that that as long as note medium 104 is oriented to be engageable by the drive wheel 114 and the adhesive applicator 102, as in FIGS. 4-7, adhesive may be applied to different portions of said medium by successive strokes of push tab 111.

However, ratcheting of various elements is known and may be accomplished by many arrangements other than that here recited; therefore, the instant art is not intended to be thusly limited.

One skilled in the art will readily appreciate that the previously described deposition of adhesive on different portions of note medium 104 by the successive strokes of the rack 109 may be accomplished by means other than a ratchet.

Figure 24:
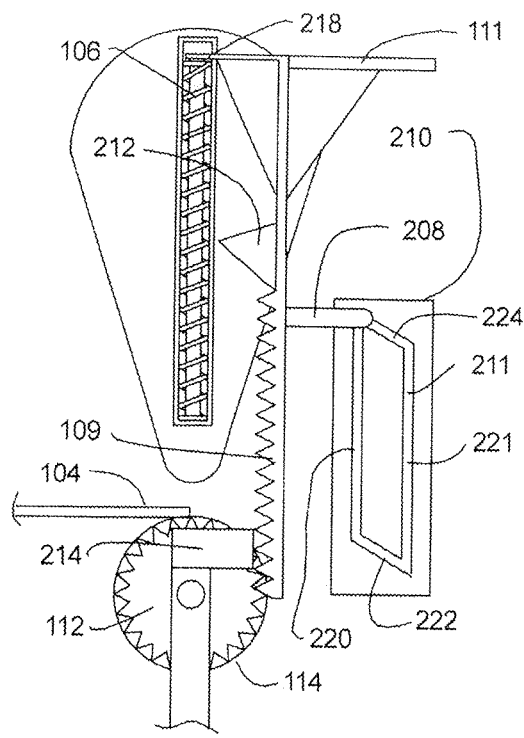
FIG. 24 is a front view of an embodiment of the invention.
Figure 25:
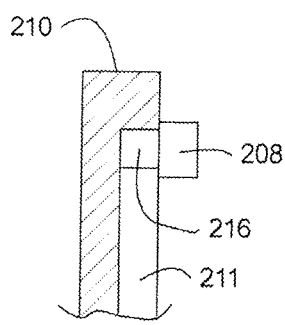
FIG. 25 is a side cross sectional view of elements of an embodiment of the invention.
Figure 26:
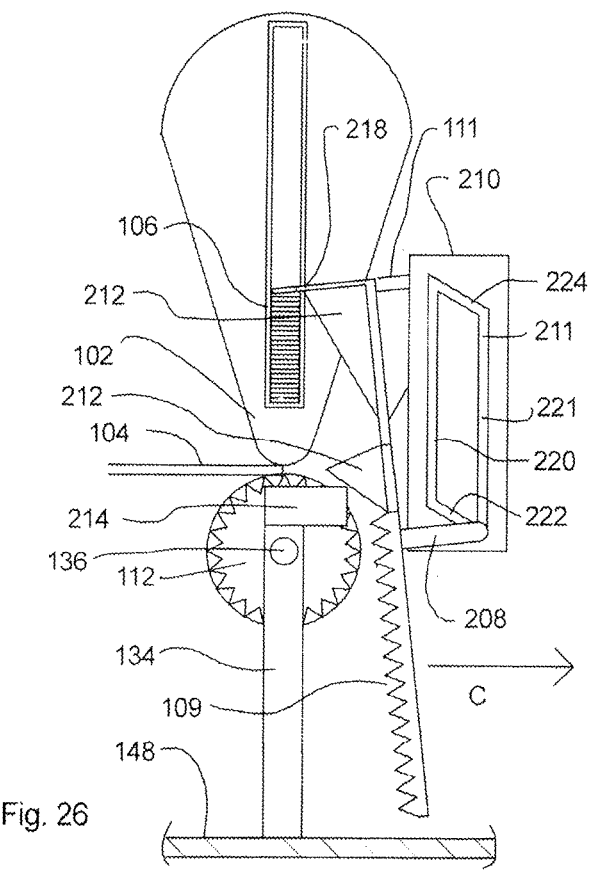
FIG. 26 is a front view of an embodiment of the invention.

In example, FIGS. 24, 25, and 26 show the rack 109 having a rack guide 208 extending essentially normal therefrom to engage a rack guide track 210 having a rack guide slot 211. As seen in FIG. 25, the rack guide 208 comprises a pin 216 which engages the rack guide track slot 211. Also, the rack 109 comprises a rack disengagement shim 212, and disposed proximal the pinion 112 is a shim block 214. Further, the rack guide slot 211 connected at their extremes by a first essentially vertical course 220 and a second essentially vertical course 221 connected at their extremes by a first essentially canted course 222 and a second essentially canted course 224. The communication between the rack 109 and the bias element 106 is pivotable connection 218.

Now, it will be understood that when the rack 109 is extended in direction E, the rack guide pin 216 will travel in the first vertical course 220 in said rack guide track 210. The rack disengagement shim 212 will contact the shim block 214 whereupon the configuration of said shim 212 and block 214 will cause movement of the rack 109 in direction C, said movement allowable by pivotability of connection 218, thusly disengaging the rack 109 from pinion 112 and moving the rack guide pin 216 in first essentially canted course 222 to the second essentially vertical course 221. The bias element 106 will then move the rack in direction D while the rack guide pin 216 travels in said second essentially vertical course 221 thusly maintaining the disengagement of rack 109 and pinion 112 as said rack moves in direction D. The rack guide pin 216 then encounters the second essentially canted course 224 whereby it is guided back to first vertical course 220 at its original position as seen in FIG. 24.

FIGS. 8, 9, 10, 11, 12, and 13 show that the device 100 may be disposed in housing 148. The housing 148 may comprise access to an on/off switch 146 of any type deemed suitable by one skilled in the art. The housing 148 may also comprise a medium slot 150 providing access to the device 100 by note medium 104. The housing may additionally have one or a plurality of note medium stops 152 to facilitate optimal positioning of the note medium 104 for most effective operation of the device 100.

Figure 10:
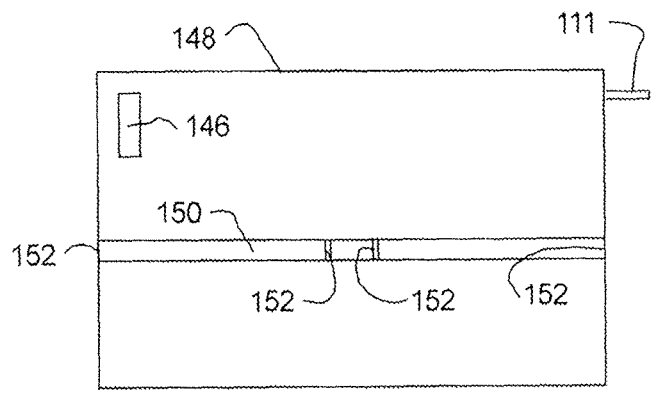
FIG. 10 is a front view of elements of the invention.
Figure 11:
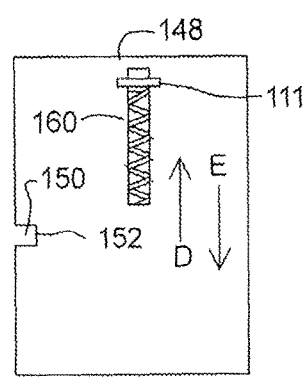
FIG. 11 is a side view of elements of the invention.

FIGS. 10 and 11 show that the device housing 148 may have a push tab slot 160 allowing the push tab 111 to extend through the device housing 148 where it may be accessed and moved freely in directions indicated by arrows D and E.

Figure 13:
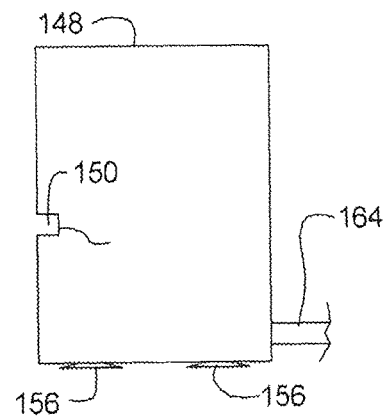
FIG. 13 is a side view of elements of the invention.

FIG. 13 shows that the device housing 148 may additionally provide access to the device 100 by a power cord 164. Thus, one skilled in the art will readily appreciate that the motor 130, shown in FIGS. 1, 2 and 4 plus any other element of the device 100 requiring energization may be powered by electrical current supplied through a source external to the device 100 or the device housing 148.

Additionally, the device housing 148 may have one or more anchors 156, in example suction devices, to fix the device to a suitable surface, in example a desk top, thusly providing requisite stability for operation of the device 100.

Figure 14:
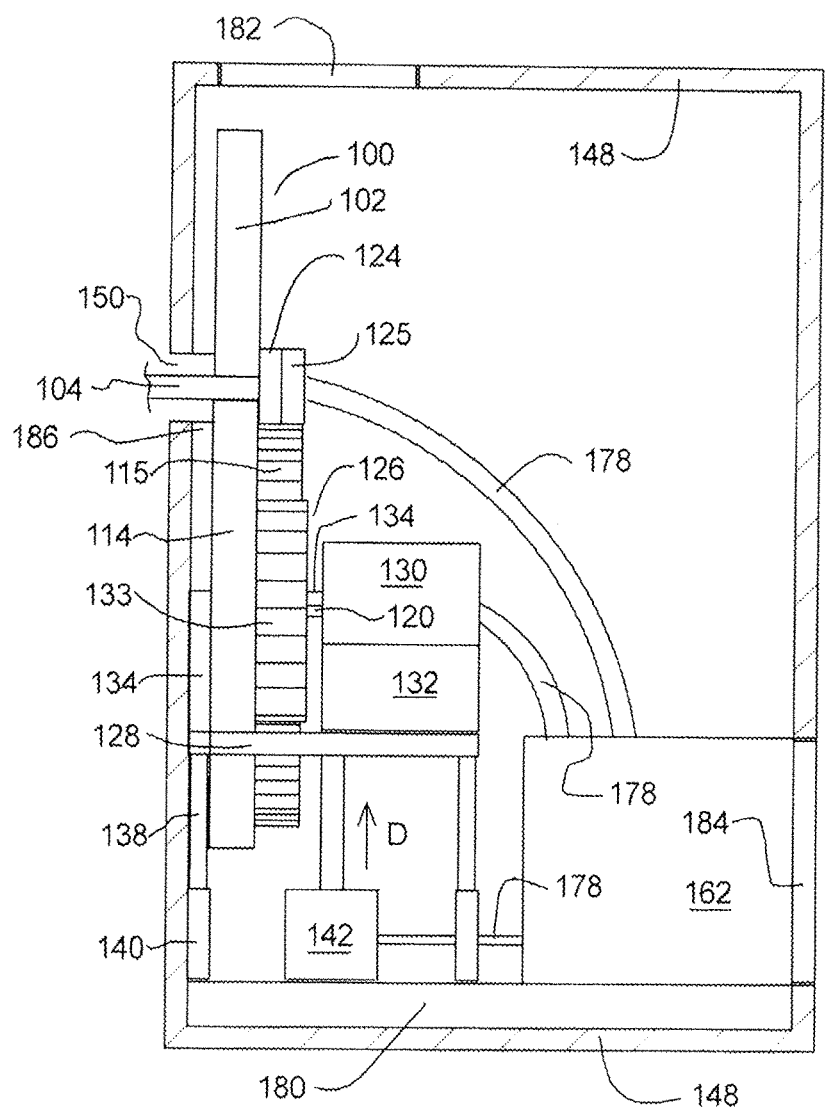
FIG. 14 is a side, cross sectional view of elements of the invention.

FIG. 14 shows the device 100 disposed within the housing 148 with operational access to said device 100 for note medium 104 and activation means for the device 100 and its components provided as previously described. In particular, note medium 104 is inserted through the note medium slot 150, where it may seat against the medium stop 152, seen in FIGS. 8-13, and thus be positioned where it is an optimum operational relationship with the adhesive applicator 102 and the medium drive wheel 114 whereby adhesive application will be restricted to a portion of said medium, whereupon said note medium 104 was detected by sensor 124 and the logic unit 125 directed activation of the solenoid 142 which pressed said note medium 104 between the adhesive applicator 102 and the note medium drive wheel 114, by raising the drive assembly platform 128, and directed activation of the note medium drive wheel 114. All said actions then result in application of adhesive to the note medium 104 as previously described.

FIG. 14 also depicts that the device housing 148 may also comprise an access panel 182 for elements of the device 100, especially the adhesive applicator 102 which will require replacement from time to time and other components which will require replacement or repair periodically.

Figure 12:
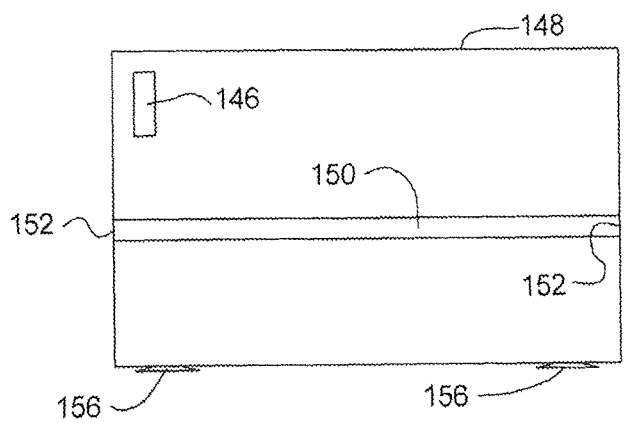
FIG. 12 is a front view of elements of the invention.

Also recited in FIG. 14 is that the motor 130, solenoid 142, and/or logic unit 125 or any other element requiring energization may be powered by battery or cell 162 and that the device housing 148 may comprise a battery access panel 184 allowing replacement of said battery or cell 162. Additionally shown is that the device housing 148 may comprise a ballast 180 which in addition to or in lieu of the anchors 156 shown in FIGS. 12 and 13 provides stability required for best operation of the device.

Now it will be readily understood that the device 100 must communicate with the device housing 148 to fix the device 148 in stable relationship with said housing 148. Such interfaces can easily be contrived by one skilled in the art and are not described in detail. Also, sensors 124 and logic units 125 of types and configurations required to regulate operation of the device 100 as previously described as well as interfaces with elements regulated thereby are known and can easily be contrived by one skilled in the art so are not described in detail. Further, interfaces in example wires 178, between power sources and elements of the device 100 requiring energization are known and easily contrived by one skilled in the art and are therefore not described in detail.

Figure 8:
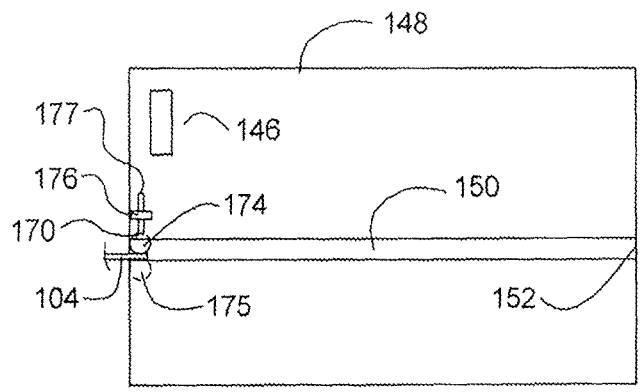
FIG. 8 is a front view of elements of the invention.
Figure 9:
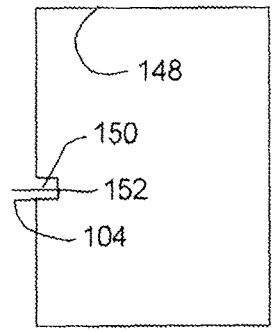
FIG. 9 is a side view of elements of the invention.

FIG. 8 shows that the device housing 148 may comprise access to an on/off switch 146 of any of sundry well known types. In example, the switch 146 may be of a type that stays in one configuration until moved, in example a rocker type, a slide type, toggle type, etc. Thus, the switch 146 may be closed and the device 100 activated continuously until the switch 146 is opened.

The switch 146 may be of a type that is biased in open position. Therefore the switch 146 may be closed and held thusly activating the device 100 for as long as said bias is overcome. The device 100 is deactivated when the switch 146 is released and said bias opens the switch 146.

Now it will be understood that the device 100 will operate satisfactorily without the sensor 124 and/or logic unit 125. In such instance, a user of the device 100 may simply insert a note medium 104 into the slot 150 then close the switch 146 directly activating the motor 130 and thus the device 130. And, in the instance when the device comprises the switch type which remains either open or closed, it will be understood that a user's hands are required only to insert the note medium 104 and move the switch 146.

It will also be understood that the switch 146 may serve only to activate and deactivate the sensor 124 and/or logic unit 125. In such case, a user need only insert note medium 104 into slot 150 whereupon the sensor 124 and/or logic unit 125 will engage the motor 130 and solenoid 142 when the sensor detects said note medium 104 then deactivate the motor 130 and solenoid 142 when the note medium 104 has passed between the engaged adhesive applicator 102 and medium drive wheel 114 to the extent of its length.

Therefore, in particular embodiments, the device 100 may be operated in fully automatic manner with insertion of the note medium 104 being the only manual operation required.

FIGS. 3, 3A and 14 shows that in the operation of the device 100, the medium drive wheel 114 serves a function analogous to that of a hammer 186 to impart force in direction indicated by arrow D which allows function of the device 100 as previously described. Also shown is that the surface of the drive wheel 114 in contact with the note medium 104 at any one time is relatively small and varies with rotation of the medium drive wheel 114. Likewise, as is shown, as the adhesive applicator functions, said applicator 102 is in contact with only a relatively small portion of the note medium 104. However, the operational configuration of the device 100 need not be limited to said parameters.

Figure 16:
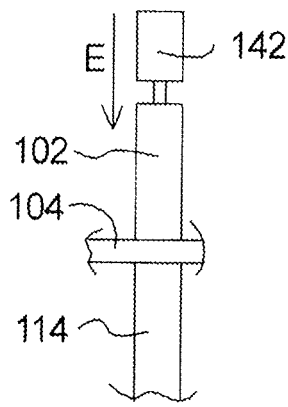
FIG. 16 is a side view of an embodiment of the invention.
Figure 17:
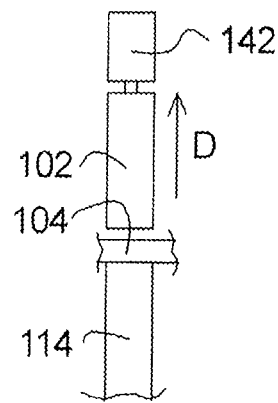
FIG. 17 is a side view of an embodiment of the invention.
Figure 18:
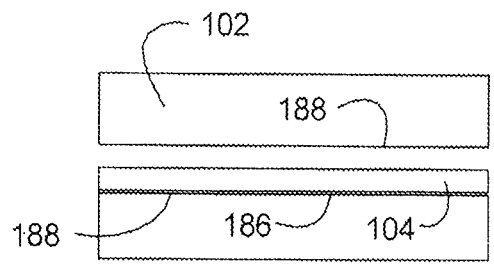
FIG. 18 is a front view of an embodiment of the invention.
Figure 19:
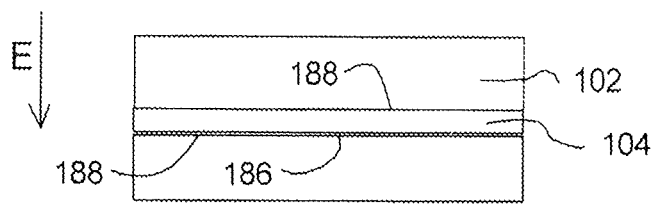
FIG. 19 is a front view of an embodiment of the invention.
Figure 20:
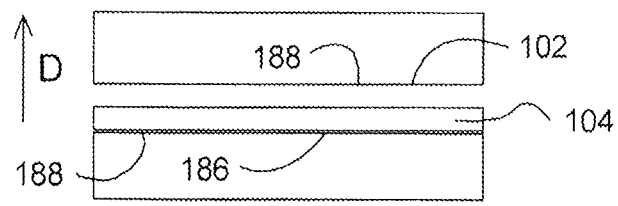
FIG. 20 is a front view of an embodiment of the invention.

In example, FIGS. 16, 17, and 18 show that, rather than an annular structure such as a wheel, the hammer 186 may comprise an essentially linear and/or planar surface 188, the preponderance of which may be brought to bear against note medium 104. Likewise, the adhesive applicator 102 may comprise an essentially linear and/or planar surface 188 which may be brought to bear against the note medium 104 to cause deposition of adhesive on a portion of said note medium 104.

Now, it will be readily appreciated that in such configuration, the note medium 104 need not be urged to travel substantially the extent of its length between the medium drive wheel 114 and the adhesive applicator 102 since said configuration allows deposition of adhesive on the note medium 104 over an area substantially equal to that of the essentially linear and/or planar surface of said adhesive applicator 102 and said area may be contrived to be sufficient to deposit enough adhesive to the note medium 104 for said note medium 104 to adequately function as required.

It will further be readily appreciated that, in such configuration, since the note medium 104 need not be urged to travel essentially the extent of its length between the medium drive wheel 114 and the adhesive applicator 102, the motor 130 and other elements related to said urging may be eliminated. Also, though the instant art in particular embodiments, has been taught as having operative force imparted I direction indicated by arrow D, that is whereby the note medium 104 is urged against the adhesive applicator 102, one skilled in the art could easily contrive a functional device 100 wherein the adhesive applicator 102 is urged against the note medium 104 by force in direction indicated by arrow E.

In example, as in FIG. 16 wherein the solenoid 142 is shown in communication with the adhesive applicator 102 so as to impart force thereto in direction indicated by arrow E.

Now, it will be readily appreciated by one skilled in the art that the previously taught device 100 will produce a finished note 168 from the note medium 104 having an adhesive strip 168, as seen in FIG. 15. Said note medium 104 may then be written or printed upon and fixed adhered to a convenient location or the medium 104 may be written upon and the finishing adhesive application then accomplished. Additionally, the medium 104 need not be limited to communicative indicia but may comprise purely decorative or artistic representation. Further, it will be understood that embodiments of the device 100 may be operated in manual modes or fully automatic, virtually hands free modes. Also, while the device 100 has been described as applying adhesive to a note medium 104, one skilled in the art will readily appreciate that the device 100 need not be thusly limited but may be used to apply adhesive to other media, in example flaps of envelopes, cartons, fabrics, etc.

Additionally, FIG. 8 shows that the device 100 may comprise means to fix the note medium 104 in operative orientation with elements of the device 100. In example, seen is a slot 177 in housing 148 allowing communication between a roller tab 176 and first roller 174. Therefore, it will be understood that by moving the roller tab 176 in direction E, the medium 104 may be pressed between said first roller 174 and a second roller 175 thusly fixing said medium in operative position while rotation of said rollers will allow movement of medium 104 in direction C as required. Thus, hands free use of the device 100 may be facilitated.

Also, though the device 100 has been described having motorized embodiments regulated by sensors and/or logic units and manually powered embodiments having no sensors and/or logic units, one skilled in the art could easily incorporate sensors and/or logic unites into a manually powered embodiment of the device.

In example, as in FIG. 2 which shows a logic unit 125 and a sensor 124 associated therewith. Also seen, are a solenoid 142 and a rack stop 228. Now, it will be readily appreciated that when the sensor 124 detects the absence of note medium 104, the logic unit 125 may activate the solenoid 142 which will move the rack stop 228 to engage the rack 109, as shown by broken lines, thusly preventing further movement of the rack 109. Contrarywise, if the sensor 124 detects the presence of note medium 104, the logic unit 125 may activate the solenoid 142 to disengage the rack stop 228 from the rack 109 thusly allowing the rack 109 to move.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for application of adhesive to a medium comprising:
    a) providing a device having
        a housing,
        an adhesive applicator with a dispenser having adhesive tape on a tape roll,
        a hammer, and
        one or more sources of operative force; and
    b) hand feeding a medium to the housing whereby the medium is then grasped between the adhesive applicator and the hammer with at least one of the adhesive applicator and the hammer moving linearly to contact the medium;
    c) the medium then being fed by the device while unrolling the adhesive tape from the dispenser onto the medium between the adhesive applicator and the medium while at least one of the one or more sources of operative force applies an operative force through the hammer against the medium thereby assisting in applying the adhesive to the medium;

d) thereby providing the medium with an exposed adhesive strip for use in adhering the medium to a surface.

2. The method of claim 1 wherein the hammer provided further comprises a rotatable drive wheel or alternatively or concurrently a ratchet.

3. The method of claim 1 wherein the one or more sources of operative force comprise a motor, or alternatively or concurrently at least one solenoid, or alternatively or concurrently manual application of force.

4. The method of claim 1 wherein the adhesive is applied linearly along an edge of the medium in a strip of no more than about 1 inch of thickness with the medium extending externally from a side slot out of the housing while applying the adhesive.

5. The method of claim 4 wherein the adhesive tape is applied to no more than half a width of the medium.

6. The method of claim 4 wherein the device further comprises a sensor and alternatively or concurrently a logic unit; the sensor or alternatively or concurrently the logic unit detecting at least one of an absence or presence of the medium or alternatively or concurrently activating or deactivating, either separately or in concert, one or more of the operative force sources with the supply of the medium by a user.

7. The method of claim 1 further comprising the step of securing the application of the adhesive tape at or before a terminating edge of the medium.

8. The method of claim 1 wherein the step of providing a device further comprises one or more sources of operative force comprise a motor, or alternatively or concurrently at least one solenoid, or alternatively or concurrently manual application of force wherein the source of operative force comprising manual application of force comprises a rack and pinion and a bias element.

9. The method of claim 1 further comprising the step of hand removing the medium from the housing after applying the adhesive tape with the adhesive strip terminates at or before an edge of the medium.

10. The method of claim 9 further comprising the step of applying the medium to a surface thereby attaching the medium to the surface.

11. The method of claim 10 whereby all of the adhesive strip provides a non-permanent adhesion with the surface.

\* \* \* \* \*